United States Patent Office 3,133,245
Patented May 12, 1964

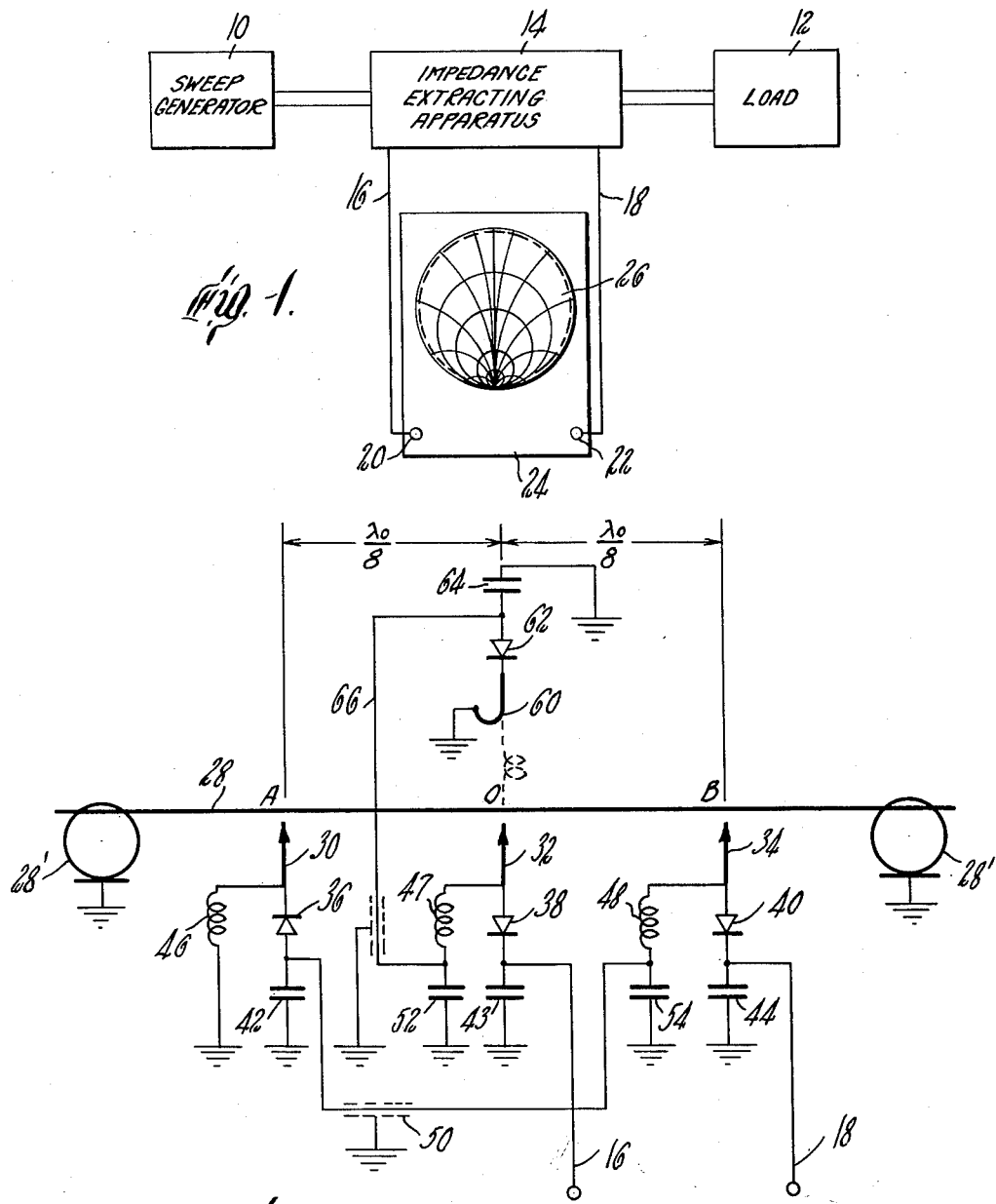

3,133,245
MULTIPLE PROBE IMPEDANCE MEASURING
DEVICE
Edward H. Shively, Raymond, Maine, assignor to
Dielectric Products Engineering Co., Inc., Raymond, Maine, a corporation of Maine
Filed Mar. 14, 1961, Ser. No. 95,712
5 Claims. (Cl. 324—58)

This invention relates to measuring techniques at radio frequencies, and more particularly it is concerned with the measurement of impedance characteristics exhibited by radio frequency wave transmission and absorption devices.

In the past, a classic tool for the measurement of impedance at frequencies in the very high frequency region and above has been the slotted line. One of the main drawbacks of the slotted line is that it does not provide indications of impedance directly. Rather, it is necessary to measure the maxima and minima of standing waves on the line as well as their location with respect to the device under consideration. From these measurements it is then possible to ascertain the reflection coefficient at the frequency of measurement as defined by the impedances of the device and the transmission medium to which it is connected, the latter generally being known. This is a time-consuming procedure even when a chart is used as an aid. It is especially undesirable when, as is common, a number of measurements must be made over a band of frequencies so that the impedance characteristics of a device adapted to operate over that band of frequencies can be determined.

To overcome this drawback, there have been developed several types of impedance measuring apparatus which enable the display of reflection coefficient information on indicating devices such as cathode ray oscilloscopes. These apparatus include means to extract radio frequency wave energy from the transmission line at spaced locations along the line, and produce various complex values of the waves extracted. By proper combination of these values it is possible to obtain a pair of radio frequency waves representing in amplitude the rectangular coordinates of a polar plot of the desired reflection coefficient from which are derived unmodulated signals representing their amplitude which are applied to the oscilloscope. One typical apparatus of this kind is relatively costly as it employs a number of hybrid junctions to produce the necessary wave combinations. Unless these hybrid junctions are of high quality, that is unless they are precisely compensated, they will introduce reflections of sufficient magnitude to impair the accuracy of the measurements.

It is an object of the present invention to provide direct indicating apparatus of a simplified nature for the measurement of impedance at high frequencies and above.

Another object of the invention is to provide an improved impedance measuring and indicating apparatus in which electric and magnetic wave components are extracted and combined in suitable form for application to a cathode ray oscilloscope so that complex impedance values may be directly indicated.

The novel features of the invention together with further objects and advantages thereof will become apparent from the following detailed description of a preferred embodiment, in conjunction with the drawing, in which:

FIG. 1 is a block diagram of impedance measuring apparatus according to the invention; and FIG. 2 is a schematic diagram of the impedance extracting apparatus of the invention shown in FIG. 1.

With reference first to FIG. 1 it will be observed that the system includes a sweep generator 10; a load 12 or device whose impedance is to be measured, and an impedance extracting apparatus 14 disposed in the path of the energy being fed to the load 12 by the generator 10. Included in the extracting apparatus, as will appear more in detail hereinafter, are means to sample the radio frequency energy and to derive unmodulated signals therefrom representing the rectangular coordinates of the reflection coefficient defined by the load impedance. The apparatus 14 includes output lines 16, 18 on which the signals appear. These signals are amplified as necessary and then are applied to the X and Y axis input terminals 20, 22 of an oscilloscope 24. This oscilloscope has disposed in front of the cathode ray tube a transparent engraved Smith Chart mask 26 which provides a reference for the impedance information displayed thereon.

In operation, it is immaterial as regards the invention whether the sweep generator is mechanically or electronically driven. It is preferable that the frequency excursion of the sweep generator does not exceed approximately ±20 percent of its center frequency in order to avoid reduction in the accuracy of the apparatus. Insofar as the load is concerned, those skilled in the art will appreciate that it may comprise, by way of example, a radiating device, an absorptive device, or a transmission device provided with an absorptive load of known characteristics.

For each frequency within the band periodically swept by the generator, there are produced on wires 16, 18 a pair of signals representing the rectangular coordinates of the reflection coefficient at that frequency. These signals in turn cause the oscilloscope beam to be deflected correspondingly so that the point of incidence of the beam upon the screen represents in polar form the magnitude and phase of the reflection coefficient referred to a point of origin. If the impedance of the load under consideration varies with frequency, as will ordinarily be the case, it follows that the oscilloscope beam will trace a locus of points representing the reflection coefficient at various frequencies throughout the band of the sweep generator. With each successive sweep generator cycle, the trace is repeated so that even with a relatively low sweep rate, and with an oscilloscope of ordinary persistence, the entire trace of reflection coefficient versus frequency can be viewed at one time, thus providing an immediate and accurate indication of the impedance characteristics of the load under examination.

In FIG. 2 there is shown a preferred form of extraction apparatus according to the invention. The illustrated system includes a coaxial line 28 provided with three electric wave coupling probes 30, 32, 34 and associated detector assemblies 36, 38, 40, which are indicated as crystals and are spaced at equal intervals of one-eighth wave length ($\nu°/8$) along the coaxial line. Each coupling probe extracts radio frequency energy from the line and the associated detector converts this energy into an unmodulated signal of a magnitude proportional to the square of the magnitude of the extracted energy. The crystal holders are capacitively coupled to ground, that is, to the outer conductor 28' of the coaxial line 28 via capacitors 42–44, and inductances 46–48 provide direct current paths. Thus inductance 46 connects probe 30 to ground and inductance 48, on the other hand, is connected between the probe 34 and the D.C. side of crystal 36. For this connection it has been found preferable to use shielded cable 50, as shown. Inductances 47 and 48 are coupled to ground through capacitive devices 52 and 54 respectively, and line 18 is connected to the D.C. side of crystal 40.

At the same axial location as the probe 32 but angularly disposed therefrom is a magnetic coupling dectector assembly which includes loop 60 that feeds crystal 62, the crystal in turn being coupled to ground through a capacitance 64. As shown, one end of the loop is grounded, thereby obviating the need for an inductive device to establish a D.C. path, and there is a shielded lead 66 connecting the D.C. side of the crystal 62 to the grounded side of the inductance 47. The unmodulated difference signal from this combination of detector assemblies is passed to line 16.

The coupling loop 60 is primarily responsive to the standing wave current rather than to voltage, as is the case with the probes 30, 32, 34. Variations in standing wave currents are proportional to the standing wave voltage variations but are displaced in phase by 90°—an amount corresponding to one-quarter wave length along the line. In other words, the unmodulated signal derived by the detector assembly embodying loop 60 is proportional to the amplitude of the voltage standing wave one-quarter wave-length away. The relative magnitudes of the unmodulated signals derived by the probe 32 and by the loop 60 are adjusted so that the loop signal is adapted to reflect in absolute terms the signal that is derived by the probe 32. This can be readily accomplished either by adjusting the physical size or location of the loop or by introducing resistance into the direct current path.

As the frequency response of the magnetic coupling loop 60 is a function of the wave impedance, compensation should be introduced when the apparatus is in wave guide configurations as the wave impedance varies according to the equation $Z_w = n\sqrt{1-v^2}$ where $v = f_0/f$. Suitable compensation is provided by the use of a shunt capacitor. However, in the case of coaxial lines such compensation is unnecessary as the wave impedance does not vary with frequency.

In operation, each crystal detector assembly derives an unmodulated signal which represents the combined amplitudes of two waves. One is the wave transmitted from the generator to the load, and the other is the wave reflected from the load back toward the generator. As is well known to those skilled in the art, this combination gives rise to standing waves so that in effect it is a point on the standing waveform to which each detector assembly is responsive. Owing to the mode of interconnection provided between the detector assemblies embodying crystals 36 and 40, it is the difference of two such signals that is derived by these assemblies and this difference signal is caused to appear between the line 18 and ground. Likewise, the difference of the signals derived by the detector assemblies embodying crystals 38 and 62 is caused to appear between the line 16 and ground. If an oscilloscope having balanced channels is utilized the detectors may be individually connected to the X+, X−, Y+ and Y− scope terminals and the interconnecting cables omitted. The difference signal X ($V_A - V_B$) can be represented mathematically as follows:

$$X = (1 + \rho \sin\theta + j\rho \cos\theta)^2 - (1 - \rho \sin\theta - j\rho \cos\theta)^2$$
$$= (1 = \rho \sin\theta = \rho 2 \cos\theta) - [(1 - \rho \sin\theta)^2 + \rho^2 \cos\theta]$$
$$= 1 + 2\rho \sin\theta + 1 - (1 - 2\rho \sin\theta + 1)$$
$$= 4\rho \sin\theta,$$

where $\rho$ is the magnitude of the reflection coefficient and $\theta$ is the phase angle of the reflection coefficient. Similarly the difference signal Y($V_0 - I_0$) can be shown to be equal to $4\rho \cos\theta$.

However, over a band of frequencies, the positions of the points A and B are no longer exactly $\lambda/8$ from point O, and an amplitude correction factor of $$\sin\frac{\pi x}{2}$$

where $x = f/f_0$, must be applied to the oscilloscope channel fed by these probes. This may be accomplished by feeding this channel through an audio multiplying circuit, the gain of which is controlled by a signal from a discriminator reading the frequency deviation from center. It can also be accomplished by adding an RF equalizer in the form of a shorted stub to the probes which will give a rising amplitude characteristic into the detector. In some transmission lines, particularly waveguide, where the usable bandwidth is necessarily limited, no frequency correction factor need be applied, since $$\sin\frac{\pi x}{2}$$

changes by only a few percent over the band of interest.

From the foregoing it will be seen, therefore, that the signals on lines 16 and 18 will be equal to the rectangular coordinates of the reflection coefficient defined by the impedance of the line 28 and the impedance of the load. If the impedance of the line is known, it follows that the signals, as visually displayed by the oscilloscope 24 in FIG. 1, may be taken to represent directly the impedance of the load under consideration, and may be read directly via the Smith chart face plate 26.

Although the invention has been described in connection with a preferred embodiment thereof, it will be appreciated that various modifications therein are possible which do not depart from the spirit and scope of the invention. For example, a fixed frequency generator may be employed and the reflection coefficient displayed as a single point whose distance from the point of origin represents its magnitude and whose angular location represents its phase. For that matter, there is no reason in principle why indicating devices other than an oscilloscope could not be used according to the invention. As indicated above the invention is adapted to use with waveguide as a transmission medium instead of coaxial line. This type of impedance plotter permits reading small reflections directly on the transmission line without the use of a transition. While certain other types of impedance plotting circuits work well with coaxial lines, in which very smooth broad band transitions from one line size to another are available, they are difficult to apply to waveguide, where broadband transitions of very low reflection are non-existent. This impedance plotting apparatus may be utilized to read small reflections on waveguide after the small residual reflections from the probes themselves are removed by making compensating cuts or bumps in the region of the probes. Therefore, it is not intended that the invention be limited to the disclosed embodiment or the details thereof, and departures may be made therefrom within the spirit and scope of the invention as defined in the claims.

I claim:

1. Apparatus for determining the impedance relation between a transmission medium for radio frequency waves and a device terminating the medium and reflecting the waves, said apparatus comprising a generator of variable radio frequency energy for transmission by said medium, electric wave detection means disposed in the path of the waves to provide unmodulated signals representing the wave amplitudes at three locations along said path at intervals of one-eighth wave length, magnetic wave detection means disposed in said path at the same axial location as the middle one of said electric wave detection means, first circuit means to combine the signals representing the electric waves at the outer ones of said locations and to produce the difference of said signals, second circuit means to combine the signals representing the electric and magnetic waves at said middle location and to produce the difference of said signals, and means to indicate points whose rectangular coordinates are defined by the difference signals.

2. Apparatus for determining the impedance relation between a transmission medium for radio frequency waves and a device terminating the medium and reflecting the waves, said apparatus comprising a radio frequency sweep generator to provide energy for transmission by said medium, electric wave detection means disposed in the path of the waves to provide unmodulated signals representing the wave amplitudes at three locations along said path spaced at intervals of one-eighth wave length, magnetic wave detection means disposed in said path at the same axial location as the middle one of said electric wave detection means, first circuit means to combine the signals representing the electric waves at the outer ones of said locations and to produce the difference of said signals, second circuit means to combine the signals representing the electric and magnetic waves at said middle location and to produce the difference of said signals, and an oscilloscope having a vertical deflection circuit responsive to one of the difference signals, and a horizontal deflection circuit responsive to the other of the difference signals.

3. Apparatus for determining the electrical characteristics of a radio frequency impedance device, said apparatus comprising a sweep generator to provide radio frequency energy, means to transmit energy from said sweep generator to said impedance device, said transmission means including a coaxial transmission line of known impedance characteristics, probe coupling elements to obtain radio frequency signals from the line representing the electric wave amplitudes at three locations spaced at intervals of one-eighth wave length, a loop coupling element to obtain radio frequency signals from the line representing the magnetic wave amplitude at the same location as the middle one of said probe elements, a crystal detector operatively connected to each coupling element to demodulate the signals, circuit means to combine the signals representing waves from the outer probes and from the middle probe and said loop and to produce first and second difference signals, an oscilloscope having a vertical deflection circuit responsive to the first of said difference signals, and a horizontal deflection circuit responsive to the second of said difference signals, and a Smith chart face plate disposed in front of said oscilloscope to provide a reference for the impedance information displayed by said oscilloscope.

4. Apparatus for measuring the characteristics of an electromagnetic wave device comprising means for transmitting electromagnetic energy to said device,
a plurality of electromagnetic field probe circuit means symmetrically disposed along said electromagnetic energy transmission means at N positions, where N is an odd number, to provide a center probe position and at least one adjacent probe position on either side of said center probe position,
said positions being spaced at one-eighth wavelength intervals relative to one another,
detector means coupled to each said probe circuit means for providing an unmodulated signal as a function of the magnitude of the electromagnetic field component sensed by the associated probe circuit means,
first circuit means for combining the unmodulated signals produced by the probe circuit means at said two adjacent probe positions to produce a first difference signal,
second circuit means for combining the unmodulated signals produced by the probe circuit means at an odd number of probe positions other than said two adjacent probe positions to produce a second difference signal, and
means to apply said first and second difference signals to a utilization device to provide an indication of a characteristic of the device under test.

5. Apparatus for providing reflection coefficient information on a system operable in the ultra-high and microwave frequency region comprising a transmission line,
means to couple the transmission line into said system to receive signals from a signal generator,
a plurality of electromagnetic field probe circuit means symmetrically disposed along said transmission line at N positions, where N is an odd number, to provide a center probe position and at least one adjacent probe position on either side of said center probe position,
said positions being spaced along said transmission line at one-eighth wavelength intervals as a function of a test frequency signal from said signal generator in said ultra-high and microwave frequency region,
each said electromagnetic field probe circuit means including a probe element and a square law detector element connected between said probe element and a reference potential for providing an unmodulated signal as a function of the square of the amplitude of the standing waves in said transmission line as sensed by the probe element,
first circuit means for combining the unmodulated signals produced by the probe circuit means at said two adjacent probe positions to produce a first difference signal,
second circuit means for combining the unmodulated signals produced by the probe circuit means at an odd number of probe positions other than said two adjacent probe positions to produce a second difference signal,
one of said difference signals being proportional to $\rho \sin \theta$ and the other of said difference signals being proportional to $\rho \cos \theta$ where $\rho$ is the magnitude of the reflection coefficient and $\theta$ is the phase angle of the reflection coefficient, and
means to apply said first and second signals to a utilization device to provide an indication of the reflection coefficient of the system under test.

References Cited in the file of this patent

UNITED STATES PATENTS

| | | |
|---|---|---|
| 2,442,606 | Korman | June 1, 1948 |
| 2,605,323 | Samuel | July 29, 1952 |
| 2,611,861 | Heath | Sept. 23, 1952 |
| 2,724,800 | Hansen et al. | Nov. 22, 1955 |
| 2,797,387 | Adams et al. | June 25, 1957 |
| 2,961,605 | Broadhead | Nov. 22, 1960 |